June 6, 1939. A. S. ALEXANDER 2,161,771
VEHICLE ACCESSORY
Filed Dec. 30, 1938
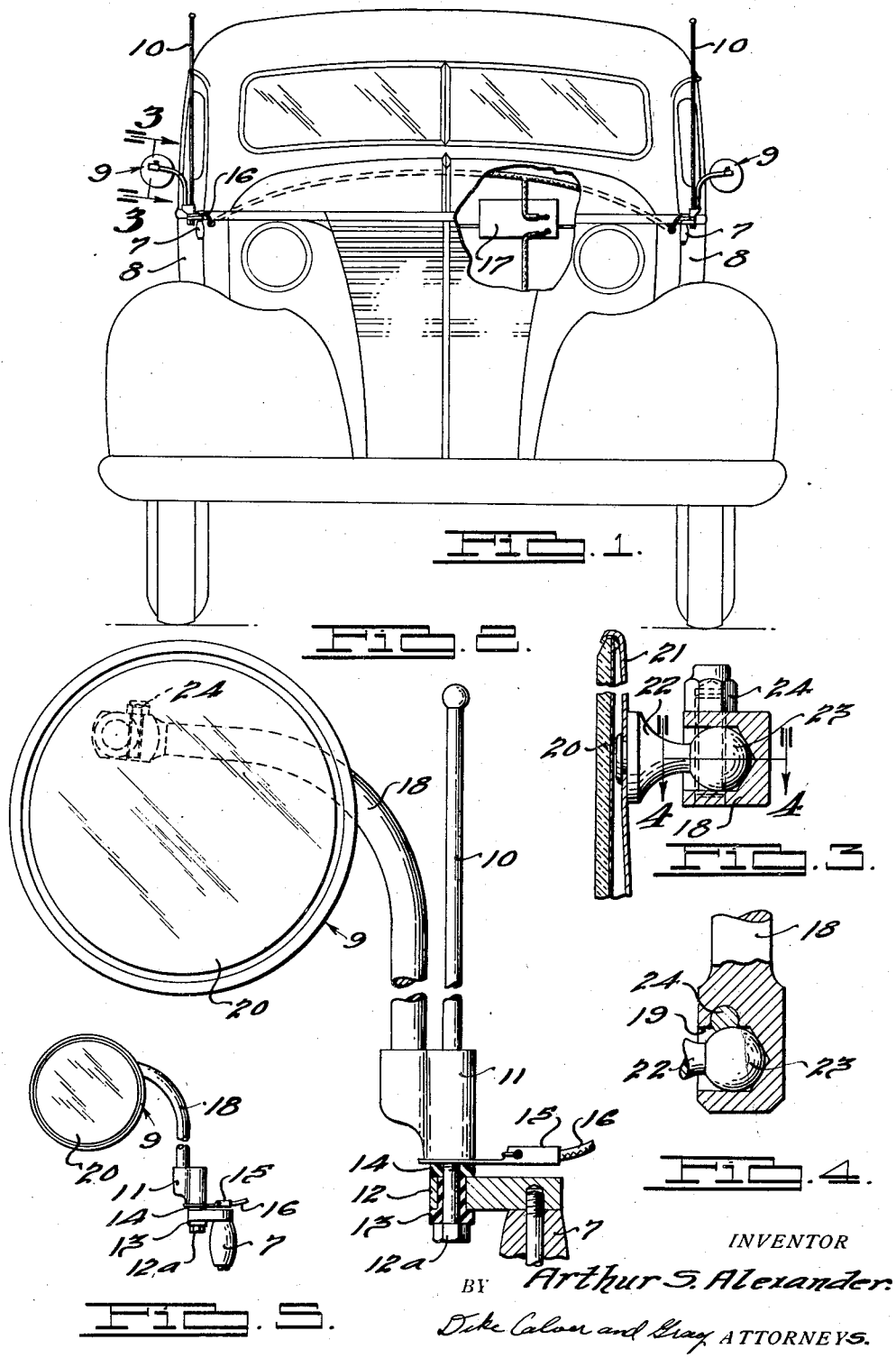
INVENTOR
BY *Arthur S. Alexander*
*Dike Calver and Gray*, ATTORNEYS.

Patented June 6, 1939

2,161,771

UNITED STATES PATENT OFFICE 2,161,771

VEHICLE ACCESSORY

Arthur S. Alexander, New York, N. Y., assignor, by mesne assignments, to Monarch Governor Company, Detroit, Mich., a corporation of Michigan Application December 30, 1938, Serial No. 248,473

3 Claims. (Cl. 250—33)

The present invention relates to improvements in a vehicle accessory, and particularly to one which is capable of serving at the same time as a rear view mirror and an antenna for a radio receiving set installed within the vehicle.

It is well known to those familiar with the structure of vehicle bodies, particularly automobile bodies, that vehicle radio antennas of various types are often attached to the exterior of the vehicle body such, for example, as the telescopic whip type which extends above the top of the body, the suction cup type which is fixed along the outer surface of the roof and the projecting rod type which is fastened to a fender or the like and extends upwardly usually to a relatively great height. It is also well known in the vehicle body art to secure a mirror, normally a rear view mirror, to the outer surface of a vehicle body at a location thereupon suitable for an occupant of the vehicle to look into the mirror chiefly for the purpose of observing objects located behind the said vehicle and especially other vehicles approaching from the rear.

It is one object of the present invention to provide a vehicle accessory adapted for mounting upon the outer surface of the vehicle body, which accessory combines in one assembly a mirror member and a vehicle radio antenna so that safety in operation of the vehicle is encouraged while at the same time an antenna is supplied.

It is another object of the invention to provide an accessory of the foregoing character in which the metallic portions of the aforesaid mirror member may serve as at least a part of the wave receptive area of the accessory; and one in which the said metallic portions may serve exclusively as such wave receptive area, if desired.

It is a further object of the invention to provide a vehicle accessory of the above character which is easily mounted, one which is compact in structure, attractive in appearance, and adapted to be installed at a desired suitable location upon a conventional vehicle body.

Other objects and advantages of this invention will appear in the following description and appended claims, reference being had to the accompanying drawing forming a part of this specification wherein like reference characters designate corresponding parts in the several views.

Fig. 1 is a view in perspective, with parts broken away, of an automobile body showing one form of the invention applied thereto.

Fig. 2 is a front elevation of the form of the invention shown in Fig. 1, the lower portion being in section in order to show the way in which the accessory is applied to the vehicle body as well as the insulating means utilized to insulate portions of the accessory from the attaching means and vehicle body.

Fig. 3 is a fragmentary vertical section of the form of the invention shown in Figs. 1 and 2 and is taken along the lines 3—3 of Fig. 1 in the direction of the arrows.

Fig. 4 is a detail view of a ball and socket mechanism for connecting the reflector and shank portions of the mirror and is a cross section taken along the lines 4—4 of Fig. 3 in the direction of the arrows.

Fig. 5 is a view generally similar to Fig. 2 but shows one modification of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing and particularly to Figs. 1 to 4 inclusive, a preferred mirror and antenna unit embodying the present invention is there shown in one of its applications, namely, as applied to the top of an exteriorly projecting portion of the forward door hinge 7 of an automobile body 8. However, my accessory may be applied to a door pillar or to any convenient and suitable place on the outer surface of the vehicle body. The present accessory comprises, in general, a mirror member, indicated generally by the reference numeral 9, having a conventional metallic backing portion and bracket. The mirror member 9 is fixed to a supporting bracket 11 which also carries a projecting metallic rod 10. To the supporting bracket 11 is secured an attaching member or base 12, by means of which member the entire accessory is applied to the vehicle body. The base 12 is insulated from the remainder of the accessory by the insulators 13 and 14. A metallic clip 15 contacts the bracket 11 and is adapted to receive the end of a wire, such as the lead-in wire 16. The lead-in wire 16 is therefore connected with the metallic portions of the mirror 10 as well as with the rod 12 and serves to connect the said members with a radio receiving set installed within the vehicle, indicated generally by the reference numeral 17. It is to be understood, however, that more than one accessory may be utilized in which event the lead-in wire 16 serves to interconnect the plurality of accessories as well as to connect them with the radio set 17.

Referring in detail to the mirror member 10, this member may be of any type, construction, and design providing that it possesses metallic portions. However, such construction conventionally and preferably includes a bracket continuation or supporting shank 18 which may be curved or bent in the manner indicated in Fig. 2. The upper end or head of the shank 18 possesses a laterally facing chamber or indenture 19 (Fig. 4). The mirror member 9 is provided with a conventional reflector unit, which reflector may consist of a silvered glass 20 or an equivalent reflecting surface encased within and held in place by a metallic backing or plate 21. The plate 21 preferably possesses a flanging about its outer periphery turned to form a channel. The outer periphery of the reflecting surface 20 is fitted within the said channel and may be beveled as shown in Fig. 2 in order to better fit therewithin.

The reflector unit is connected with the metallic shank 18 by pivotal means. A preferred means of so connecting the aforementioned members is illustrated in Figs. 3 and 4. As shown, a stubby projection 22 is fixed to the outer surface of the plate 21. This extension is preferably eccentrically positioned on the plate 21 such, for example, as at or near the outer rim of the reflector, as clearly indicated in Fig. 2. The outer end of the projection 22 terminates in a sphere or ball 23. This ball 23 is adapted to fit within the chamber 19 in the shank 18 and is held in place therewithin by means of the nut and bolt 24 in the manner clearly indicated in Fig. 4; that is, the bolt 24 is positioned to contact the ball 23 and frictionally squeeze it against the walls of the chamber 19. Such an arrangement firmly retains the stubby extension in place, but allows movement of the ball-like terminus thereof relative to the shank 18.

From the foregoing structure joining the reflector and the shank, it will be seen that the position of the reflector may be adjusted in any one of a relatively wide variety of positions relative to the shank. Due to the ball and socket structure and eccentric mounting of the stub 22, a given point on the periphery of the reflector 20 may rotate circularly in a vertical plane about the ball and socket joint as a center. In addition, the said reflector may move in a horizontal plane and combinations of these movements may be effected. Consequently, the reflector unit may be spaced in a lateral direction away from the shank 18 for a distance approaching its diameter or it may be similarly spaced in a direction toward the shank 18 as shown in Fig. 2. Likewise the reflector may be vertically positioned above the shank or therebelow and may be thrust toward or away from the shank, or combinations of these positions may be achieved as desired.

The lower end of the bracket continuation or shank 18 is fitted within a vertically positioned blindly terminating bore in the metallic supporting member or bracket 11. In addition, the said bracket possesses an additional bore similarly formed within which the metallic rod 10 is situated. This rod 10 is preferably the telescopic whip type vehicle antenna, but may be an equivalent metallic rod suitable for wave receptive purposes. It is to be understood, however, that either or both the shank 18 and the rod 12 may be secured to the bracket 11 by any suitable fixing means. The bracket 11 and the members carried by it are secured, by suitable fastening elements, to an attaching member or lug 12. This bracket 11 is preferably so attached to the said bracket that it is revolvable and removable. One means of so attaching it is by means of the bolt 12a which extends through an aperture in the bracket 12 and is threaded into an appropriate opening in the undersurface of the bracket 11.

The bracket 12 is insulated from the bracket 11 by means of the insulators 13 and 14. As indicated in Fig. 2, the insulator 13 is sleeve-like in structure so that it fits within the opening in the bracket 12, and also accommodates the bolt 12a which extends through its central longitudinal bore. The insulator 14 is washer-like in structure and is interposed between the bracket 12 and the undersurface of the bracket 11. Between the insulator 14 and the bracket 11 is situated a metallic clip 15. This metallic clip possesses a flattened punctured inner terminus, through which puncture the bolt 12a continues so that the said clip is clamped between the upper face of the insulator 14 and the undersurface of the bracket 11, and therefore is in metal to metal contact with the bracket 11 but is insulated from the bracket 12 and body 8. The outer projecting end of the clip 15 possesses a channel-shaped terminus adapted to receive the end of a wire 16. This wire 16 is inserted within and is fixed to the said channel and serves as a lead-in wire connecting my accessory with the radio receiving set 17 installed within the vehicle, as indicated in Fig. 1. From the above structure it will be seen that the said lead-in wire is placed in metal to metal contact with the bracket 11, the mirror assembly 10 and the projecting metallic rod 12; but is insulated from the bracket 12 by means of the insulators 13 and 14 and, consequently, is insulated from the automobile body 9.

The bracket 12 is adapted to be applied to the upper portion of the projecting part of the hinge 7 of the vehicle body 9. As shown in Fig. 2 the said bracket possesses a blindly terminating opening threaded to receive the bolt of the hinge 7 as shown. It is to be understood, however, that my accessory may be mounted to other parts of the automobile body and that suitable changes in the bracket 12 may be made to effect such mounting. Such changes are considered evident to a mechanic.

A modification of the present invention is shown in Fig. 5. As there shown, the metallic rod 10 has been eliminated. Consequently, the bracket 11 carries the mirror member 9 only. Except for this alteration in structure, the present modification is like that of the preferred structure above described. In this modification, the metallic portions of the mirror member 9, particularly the shank 18 and backing 21 as well as the bracket 11, are utilized exclusively as the wave receptive area of the accessory, that is, as the antenna for the vehicle radio 17.

I claim:

1. For use with a vehicle body, a combined rear vision mirror and radio antenna supporting bracket, said bracket having associated therewith means for insulating the same from the vehicle body and having a base comprising mounting means for securing the same upon said body; said bracket having an arm extending outwardly and upwardly with respect to said base and having a rear vision mirror including a metal backing secured upon its outer end, whereby, when the base is mounted upon the body, the mirror is spaced outwardly from the body, said bracket having antenna rod receiving means at a point spaced outwardly and upwardly from said mounting means for said base, and an antenna rod having its lower end secured to said rod receiving means, whereby, when said bracket is mounted upon said body, the antenna rod is spaced outwardly from the vehicle body, said bracket, said mirror backing and said antenna rod being in continuous electrical contact and all being adapted to serve as radio antenna means.

2. For use with a vehicle body, a combined rear vision mirror and radio antenna supporting a bracket, a base for said bracket comprising mounting means for securing the same upon said body, and insulating means interposed between said base and said bracket, said bracket having an arm extending outwardly and upwardly with respect to said base and having a rear vision mirror including a metal backing secured upon its outer end, whereby, when the base is mounted upon the body, the mirror is spaced outwardly from the body, said bracket having antenna rod receiving means at a point spaced outwardly and upwardly from said mounting means for said base, and an antenna rod having its lower end secured to said rod receiving means, whereby, when said bracket is mounted upon said body, the antenna rod is spaced outwardly from the vehicle body, said bracket, said mirror backing and said antenna rod being in continuous electrical contact and all being adapted to serve as radio antenna means.

3. For use with a vehicle body having a hinged front door, a combined rear vision mirror and radio antenna supporting bracket, a base for said bracket, and insulating means interposed between the base and the bracket, said base having mounting means for securing the base to the hinge of the front door of said body and having a portion projecting outwardly from said mounting means, said bracket and said insulating means being carried by the outwardly projecting portion of said base, said bracket having an arm extending outwardly and upwardly with respect to said base and having a rear vision mirror including a metal backing secured upon its outer end, whereby, when the base is mounted upon the body, the mirror is spaced outwardly from the body, said bracket having antenna rod receiving means at a point spaced outwardly and upwardly from said mounting means for said base, and an antenna rod having its lower end secured to said rod receiving means, whereby, when said bracket is mounted upon said body, the antenna rod is spaced outwardly from the vehicle body, said bracket, said mirror backing and said antenna rod being in continuous electrical contact and all being adapted to serve as radio antenna means.

ARTHUR S. ALEXANDER.